(Model.)

H. C. SHEPARD.
APPARATUS FOR STEERING AND STOPPING SLEDS.

No. 245,571. Patented Aug. 9, 1881.

Witnesses
Henry C. Putnam
Thos Kenny

Inventor
Henry C. Shepard
By R. R. Gilman, his
attorney

UNITED STATES PATENT OFFICE.

HENRY C. SHEPARD, OF TURNER'S FALLS, ASSIGNOR OF ONE-HALF TO HENRY C. PUTNAM, OF MONTAGUE, MASSACHUSETTS.

APPARATUS FOR STEERING AND STOPPING SLEDS.

SPECIFICATION forming part of Letters Patent No. 245,571, dated August 9, 1881.

Application filed March 19, 1881. (Model.)

*To all whom it may concern:*

Be it known that I, HENRY C. SHEPARD, of Turner's Falls, in the county of Franklin and State of Massachusetts, have invented a new and useful Improvement in Apparatus for the Purpose of Steering and Stopping Sleds, Double-Runners, &c., of which invention the following specification is a full, clear, and exact description.

The object of my invention is to properly and conveniently attach to a sled or double-runner a mechanical arrangement, so that when a person is sliding, the sled will be under his control, both in steering and stopping the same.

Figure 1:
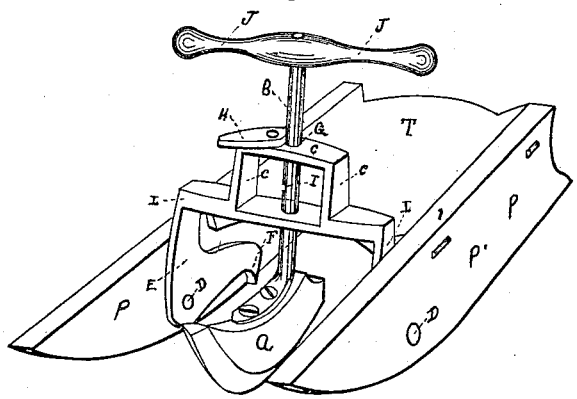

To explain my invention, I will refer to the drawings, in which Figure 1 represents my improved apparatus before it is applied to a sled, and in which A represents what I call the "rudder" or "center runner," which is used solely for the purpose of steering the sled, as hereinafter described. B is the connecting-rod, which, being firmly attached to the rudder or center runner, runs up through the holes G G and finally connects with the hand-piece J, which is used for the purpose of turning the rudder or center runner to the right or left, as will be further described. C C C show the frame or brace through which the rod B connects with the center runner and hand-piece, and said frame is used for the purpose of strengthening my invention and properly holding the rod B in its place. L L L is the lower frame, upon which the upper frame, C C C, rests and is fastened. D D are the holes for the purpose of fastening my arrangement upon a sled; and I would now state that I generally fasten my arrangement upon the inside of the two runners of a sled, about six or seven inches forward of the seat. F F show the hooks or part of my invention used for stopping the sled; and as my apparatus is fastened, generally, to the sled by the means of bolts or screws which go through the holes D D, it leaves my improvement free to work forward and backward by pulling or pushing upon the hand-piece J, and by pulling upon the hand-piece J throws the two hooks F F down into the snow or ice, thus stopping the sled almost at once; or, when the person sliding is going faster than is wished, and especially in turning corners, &c., he can regulate the speed of the sled by simply pulling upon the hand-piece J. H is the lock or slide used for the purpose of fastening the rudder or center runner up and out of the way, which is accomplished by pulling upon the hand-piece J until the cavity or notch I is up opposite the lock or slide, and then turning the slide into the notch or cavity cut in the rod B.

Figure 2:
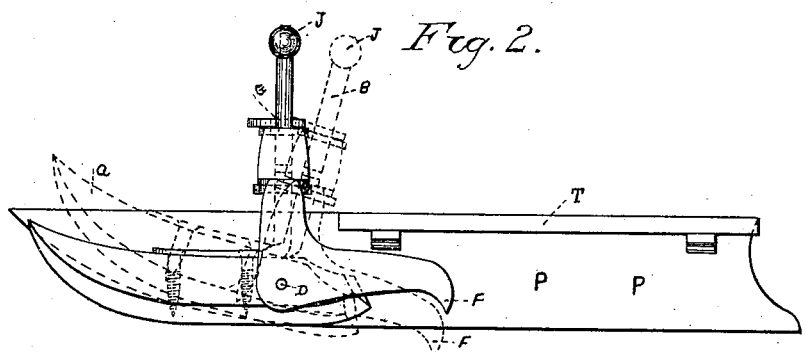

Fig. 2 shows my apparatus after it has been fastened to a sled, in which A is the rudder or center runner, as heretofore explained. B is the connecting-rod, fastened onto the rudder A, and then connecting with the hand-piece J. C is the frame or brace. D D show where my apparatus is fastened to a sled. F F show the hooks used for the purpose of stopping the sled, as heretofore described. H is the lock to fasten the rudder or center runner up out of the way. P P show the runners of the sled. I would now state that the connecting-rod B is not fastened in any way so but what the rudder or center runner can move up and down, and it is arranged in that way for the reason that when a person sliding goes over anything which may lie in his course then the rudder or center runner will rise up, thus preventing it from digging into the snow and stopping the sled. I would also state that the rudder or center runner is made so that it will run along on the snow a little ahead of the sled, and when a person sliding wishes to steer the sled either to the right or left he simply twists or turns the hand-piece J, which, being firmly affixed to the rudder or center runner, A, of course turns that also, and that rudder, running along a short distance ahead of the runners of the sled, of course turns the sled in either direction desired by the turning or twisting of the hand-piece, thus making the steering apparatus work on the same principle as a velocipede. The rudder or center runner is generally shod with round iron or some other metal, so that it will not wear away or obstruct the sled while a person is sliding.

Figure 3:
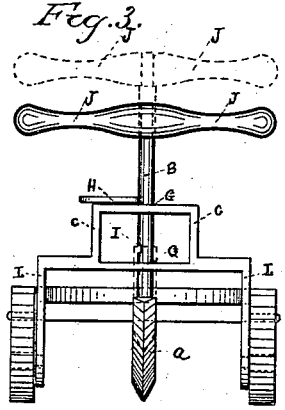

Fig. 3 shows a direct front view of my apparatus after it has been attached to a sled, substantially as heretofore described and set forth.

My apparatus, I would finally state, is constructed, in general, wholly of metal, with the exception of the rudder A and the hand-piece J, which is composed of wood, and the rudder or center runner then shod with metal, as heretofore described.

What I claim as my invention, and what I desire to secure by Letters Patent, is—

1. The combination of the rudder A, the rod B, having hand-piece J, and the hooks F F, substantially as and for the purpose specified.

2. The improved apparatus for steering and stopping sleds, double-runners, &c., described in the foregoing specification, consisting of the rudder or center runner A, the connecting-rod B, having hand-piece J, the frame, C C C, the hooks F F, the frames L L L, and the lock H, all combined, arranged, and operating substantially as shown, and for the purpose set forth.

HENRY C. SHEPARD.

Witnesses:
RAYMOND R. GILMAN,
WM. S. DANA.